United States Patent [19]

Burton

[11] 4,229,904
[45] Oct. 28, 1980

[54] METHOD AND DEVICE FOR FACILITATING THE WATERING OF HANGING PLANTS

[76] Inventor: Allen H. Burton, Box 83, Central Ave., Ocean View, Del. 19970

[21] Appl. No.: 962,963

[22] Filed: Nov. 22, 1978

[51] Int. Cl.$^3$ ............................................. A01G 9/02
[52] U.S. Cl. ......................................... 47/58; 47/67
[58] Field of Search ...................... 47/1, 66, 67, 58, 79, 47/81, 71

[56] References Cited

U.S. PATENT DOCUMENTS

| | | | |
|---|---|---|---|
| 1,095,504 | 5/1914 | Jannoch | 47/67 |
| 3,681,872 | 8/1972 | Leitch | 47/1 |
| 3,818,633 | 6/1974 | Sable | 47/81 X |

OTHER PUBLICATIONS

Anon. Ad entitled, "Water Aid", from *American Nurseryman*, Jul. 1, 1977.

*Primary Examiner*—Edgar S. Burr
*Assistant Examiner*—James R. Feyrer
*Attorney, Agent, or Firm*—Connolly and Hutz

[57] ABSTRACT

The watering of hanging plants is facilitated by disposing an elongated flexible container under the hanging pot whereby the vines on the plant may be tucked into the container with the container detachably fastened at its upper edge to the pot so that any dripping or water spillage during watering would be caught and collected by the container.

6 Claims, 4 Drawing Figures

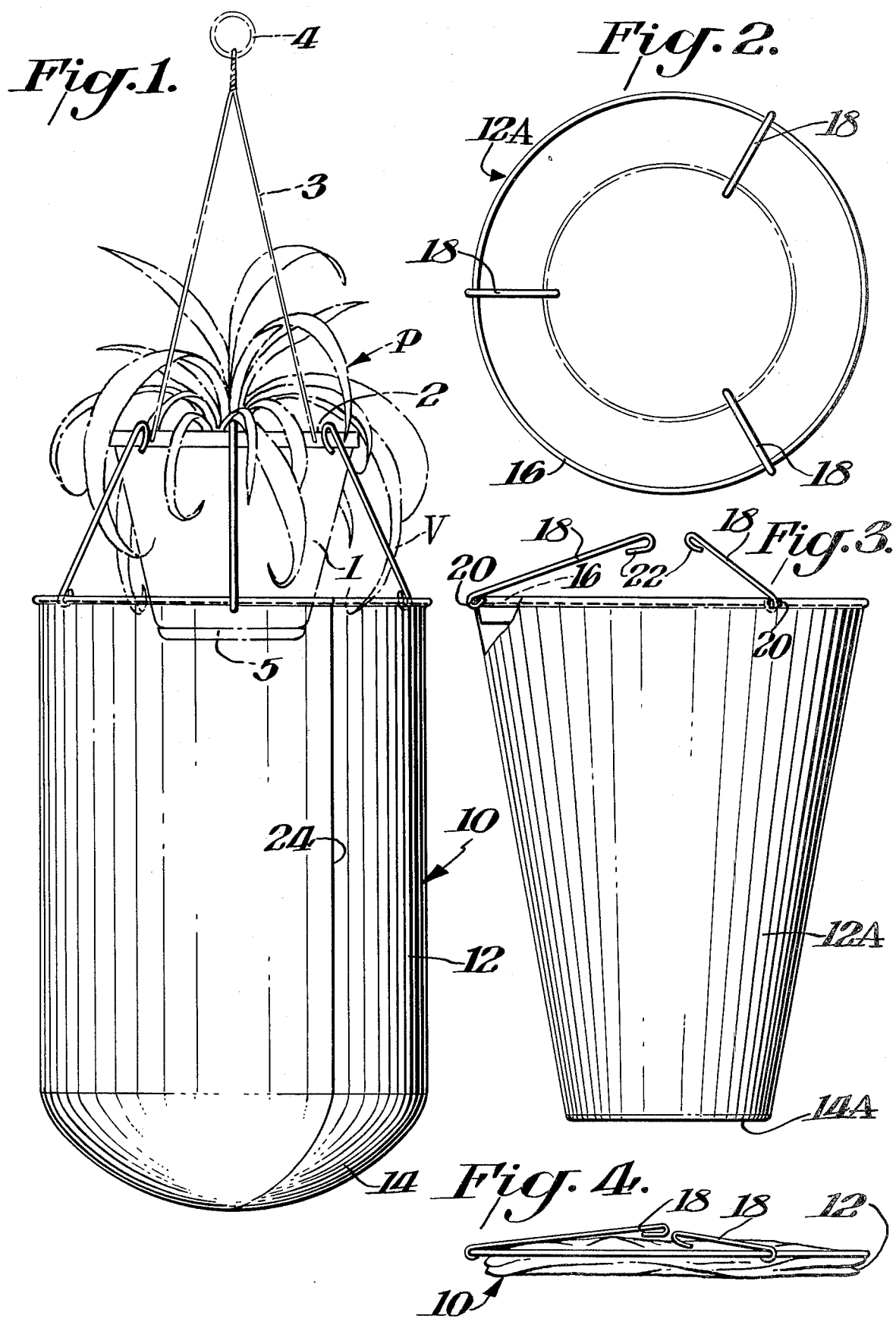

METHOD AND DEVICE FOR FACILITATING THE WATERING OF HANGING PLANTS

BACKGROUND OF INVENTION

There is a growing interest in various types of plants in the home, office and various other locations. One type of plant which is particularly attractive and has widespread appeal is the hanging plant. Such hanging plants come in a variety of different types such as spider plants, ivies, etc. While hanging plants are particularly desirable, their use does present certain problems in connection with their watering. For example, such plants are frequently located where accessability thereof is generally difficult. The user frequently must resort to chairs, stepstools, ladders or the like to reach the pot. Moreoever because of the nature of the plant, where the vines extend below the pot, it is inconvenient to take down the plant so the pot can be set in a more convenient location. Accordingly, the watering generally takes place in the actual area where the plant is hanging. Conventionally, the hanging pots include aperatures at the bottom thereof to permit the water to drain through and a shallow drip collector of disk like form is provided at the bottom of the pot for catching the waer. Frequently excess water overflows the collector and spills on the rug or furniture. A further difficulty with conventional watering techniques is that during the watering, some of the water is poured on the vines and runs down the vines outside of the pot where the dripping likewise occurs on the rug, furniture and the like. These problems are particularly acute when realizing that such plants are frequently watered at least once a week.

Various attempts have been made in the prior art to provide drip catchers for hanging baskets. U.S. Pat. Nos. 1,095,504, for example, and 3,854,242 exemplify such techniques. Among the disadvantages of this approach, however, is the fact that such prior art utilizes a shallow dish as the drip collector and thus does not overcome the problems of too much water entering the drip collector and overflowing and also water spillage by running down the vines. At best these approaches exemplify the use of a drip collector detachably secured to a hanging basket.

SUMMARY OF INVENTION

An object of this invention is to provide a method and device to facilitate the watering of hanging plants which overcomes the disadvantages of the prior art.

A further object of this invention is to provide such a method and device whereby spillage by water running down the vines is effectively avoided.

A still further object of this invention is to provide a method and device whereby an elongagted waterproof container may be quickly and conveniently mounted to a hanging pot during the watering process, and then quickly and conveniently detached so that it can be hung on another pot.

In accordance with this invention, the watering of hanging plants is facilitated by disposing an elongated flexible container under the hanging pot whereby the vines on the plant may be tucked into the container with the container detachably fastened at its upper edge to the pot so that any dripping or water spillage during watering would be caught and collected by the container. The fastening means for the waterproof container are adjustable for securement for different sized hanging pots.

Because of its flexible material, the container may be stored in a collapsed form. The adjustability of the fastening means may be accomplished by providing a fastening means in the form of elongated arms which are looped around the wire frame at the upper edge of the container for freely rotating above the frame with hooks provided on the free ends of the arms.

THE DRAWINGS

FIG. 1 is a side view in elevation of a device for facilitating the watering of hanging plants in accordance with one form of this invention;

FIG. 2 is a top plan view of the device shown in FIG. 1;

FIG. 3 is a side elevation view partly broken away of a modified device in accordance with this invention; and FIG. 4 is a side elevation view of the inventive device in collapsed form.

DETAILED DESCRIPTION

As shown in FIG. 1, a plant P is hung in a conventional pot 1 which generally includes an upper edge 2 with wire cord 3, or the like, secured to a suspended loop 4. Frequently, such conventional pots also include drip collectors 5 so that water draining through holes in the bottom of the pot could be collected therein. The plant P includes vines V or leaves which frequently are of substantial length, although for the sake of clarity, relatively short lengths are illustrated. The device 10 of this invention comprises a waterproof container 12 of any suitable shape. For example in the form illustrated in FIG. 1, container 12 is generally cylindrical with a rounded bottom 14 while the container 12A of FIG. 3 is frusto-conically shaped. Container 12 (12A) may include a circular frame member 16 at its upper end (see also FIG. 3) with the waterproof container material being folded over frame 16 and secured thereto in any suitable manner. A plurality of arms 18 are mounted to container 12 (12A). This may be done in any suitable manner. For example, in the illustrated forms of the invention, a loop 20 is provided at one end of each arm and is looped around frame 16 through suitable holes in container 12 (12A). In this manner, arms 18 may freely rotate about frame 16.

The opposite end of each arm 18 is provided with a detachable fastening means which in the illustrated forms of the invention is an integral hook 22 at each remote end thereof.

In the embodiment illustrated in FIG. 3, a shape maintaining frame such as a wire may be provided at the lower end of container 12A.

A particularly advantageous feature of the invention in both illustrated embodiments is that device 10 may be collapsed to a generally flat condition during periods of nonuse due to the flexible nature of the container material. Such flat condition is illustrated in FIG. 4. As shown therein, arms 18 are simply rotated inwardly to be generally confined within the perimeter of frame 16.

In use, when plant P is to be watered, the plant is left hanging in pot 1 suspended from loop 4. Hooks 22 are hooked over upper edge 2 of pot 1 so that container 12 (12A) is disposed beneath pot 1. Any vines V extending below frame 16 are then carefully tucked into container 12 (12A) so that the entire plant P is confined within the periphery of container 12 (12A). When plant P is in this condition the user then waters the plant and any spillage that may result by, for example, an overflow from drip collector 5 or by flowing down vines V, is caught in and collected by the container. After the plant has been sufficiently watered, hooks 22 are detached from upper edge 2 and the spillage is discarded. The same device 10 may then be used for watering any number of plants in the same manner previously described. When the plant watering has been completed, device 10 is then collapsed to the condition shown in FIG. 4 and stored until desired for reuse.

In the preferred form of this invention, the diameter of frame 16 is selected of sufficient length that the same device 10 may be used for all sized plants. This is further accomplished by the provision of arms 18 being freely pivotal so that the hooks can be detachably secured to virtually any size or shape of pot. In the illustrated form of the invention three arms 18 are shown. If desired, any other number of arms may be utilized but at least three are preferred to enhance the stability of securement.

The dimensions of container 12 (12A) may likewise be considerably varied. It is essential, however, that the length be of sufficient dimension to permit any vines or the like to be tucked into the container. It is likewise essential that the width of the containers be sufficiently large so as to completely encompass the hanging pot. In the illustrated forms of the invention, for example, the length is greater than the width.

The teachings of this invention may also be varied without departing from the spirit thereof. Thus, for example, the container may be utilized having any desired shape such as a square, rectangle or the like. It is preferred, however, that a circular shape be used to accommodate virtually all pots.

The invention may also be practiced with the utilization of any suitable material. For example, in the preferred form, container 12 (12A) is made of a waterproof plastic since plastic is lightweight and flexible. Arms 18 may, for example, be made of a material which is stiff, yet heat deformable so as to conveniently permit the formation of loops 20 and hooks 22 at the ends thereof. In its manufacture, when the upper end of the container is folded over frame 16, the upper end is heat sealed on the rim or frame 16. Similarly, a heat seal may be used for any longitudinal seam 24.

What is claimed is:

1. A method for facilitating the watering of hanging plants wherein the plant is in a hanging pot comprising the steps of disposing an elongated waterproof flexible container under the hanging pot with the container having a closed bottom and an open top of larger cross-sectional area than the cross-sectional area of the pot and with the container being deeper than it is wide, detachably securing the container to the pot thereabove with the container extending substantially, concentrically outwardly beyond the pot, tucking all hanging vines of the plant down into the container so that the plant and its vines are disposed within the periphery of the container, watering the plant by directing water to the pot from above, catching and collecting in the container any spillage from the watering of the plant in the pot, detaching the container from the hanging pot, removing the container away from the hanging pot and attaching the container to another hanging pot to facilitate the watering of the plant therein.

2. The method of claim 1 wherein the container is collapsed to a generally flat condition after being detached from the pot.

3. A device to facilitate the watering of hanging plants comprising, in combination therewith, a hanging pot having an upper rim and adapted to have a plant therein, an elongated flexible container in preformed cylindrical shape with a smooth inner wall for being disposed under and concentrically around at least the bottom portion of said hanging pot, said container being made of a flexible, non self-supporting waterproof material, said container being open at its upper end and closed at its lower end thereof, said open upper end of said container being of larger cross-sectional area than the greatest cross-sectional area of said pot, said container being of greater depth than width, detachable fastening means secured to said upper end of said container detachably coupling said container to said hanging pot upper rim with said open upper end of said container extending circumferentially outwardly beyond said pot upper rim whereby the vines or the like of said plant may be tucked down into said container and whereby any dripping or water spillage occurring during the watering of the plant is caught in and collected by the container, a substantially circular frame member said frame member defining said open upper end of said container, said fastening means comprising a plurality of arms pivotally secured to said frame member, and the free end of each of said arms terminating in a hook detachably secured to said upper rim of said pot.

4. The device of claim 3 wherein said container is collapsable and is adaptable to be stored in a flat condition.

5. The device of claim 3 wherein each of said arms has one end thereof looped around said frame member for freely rotating about said frame member.

6. The device of claim 5 wherein said hook is integral with its arm.

* * * * *

UNITED STATES PATENT OFFICE
CERTIFICATE OF CORRECTION

Patent No. 4,229,904  Dated October 28, 1980

Inventor(s) Allen H. Burton

It is certified that error appears in the above-identified patent and that said Letters Patent are hereby corrected as shown below:

Column 4, line 47, "3" should read -- 4 --.

Signed and Sealed this

Thirty-first Day of March 1981

[SEAL]

Attest:

RENE D. TEGTMEYER

Attesting Officer   Acting Commissioner of Patents and Trademarks